（12) United States Patent
Dunn

(10) Patent No.: US 9,224,999 B2
(45) Date of Patent: Dec. 29, 2015

(54) VEHICLE BATTERY MODULE

(75) Inventor: Randy B. Dunn, City Of Industry, CA (US)

(73) Assignee: Infineon Technologies Americas Corp., El Segundo, CA (US)

(*) Notice: Subject to any disclaimer, the term of this patent is extended or adjusted under 35 U.S.C. 154(b) by 683 days.

(21) Appl. No.: 12/588,654

(22) Filed: Oct. 22, 2009

(65) Prior Publication Data

US 2010/0112425 A1    May 6, 2010

Related U.S. Application Data

(60) Provisional application No. 61/109,782, filed on Oct. 30, 2008.

(51) Int. Cl.
H01M 2/02 (2006.01)
H01M 2/20 (2006.01)
H01M 10/42 (2006.01)

(52) U.S. Cl.
CPC .............. H01M 2/206 (2013.01); H01M 2/024 (2013.01); H01M 10/425 (2013.01); H01M 2/0257 (2013.01)

(58) Field of Classification Search
USPC ........................................ 429/66, 129, 130
See application file for complete search history.

(56) References Cited

U.S. PATENT DOCUMENTS

| 3,677,033 | A | * | 7/1972 | Kneeland ........................ 464/85 |
| 3,984,244 | A | * | 10/1976 | Collier et al. .................. 430/315 |
| 4,342,442 | A | | 8/1982 | Perkins et al. |
| 4,384,031 | A | | 5/1983 | Kline |
| 4,729,933 | A | * | 3/1988 | Oswald ........................... 429/59 |
| 5,112,703 | A | | 5/1992 | Koenig |
| 5,288,565 | A | | 2/1994 | Gruenstern |
| 5,318,861 | A | | 6/1994 | Harats et al. |
| 5,348,817 | A | | 9/1994 | Rao et al. |
| 5,512,390 | A | | 4/1996 | Obushenko |
| 5,583,751 | A | * | 12/1996 | Nakazawa et al. ............. 363/20 |
| 5,998,062 | A | | 12/1999 | Olson |
| 6,225,778 | B1 | * | 5/2001 | Hayama et al. ............... 320/112 |
| 6,429,507 | B1 | * | 8/2002 | Knudtsen et al. ............. 257/678 |

(Continued)

FOREIGN PATENT DOCUMENTS

DE    42 29 437 C1    11/1993
EP    0 744 784 A1    5/1996

OTHER PUBLICATIONS

Hybrid vehicle battery pack "on sale", by www.delphi.com, 1 page printed from the Internet, Jun. 24, 2009. http://delphi.com/manufacturers/auto/hevevproducts/batterypack/hvbattery/.

Primary Examiner — Ula C Ruddock
Assistant Examiner — Scott J Chmielecki
(74) Attorney, Agent, or Firm — Farjami & Farjami LLP

(57) ABSTRACT

The vehicle battery module includes cut rubber tubing attached to tops of voltaic cells. Tabs from the cells pass through seating apertures in a printed circuit board. The rubber tubing atop each cell buffers contact between the circuit board (PCB) and the cell's top edge. Solder joints secure electromechanical connection of the tabs to the printed circuit board. A strain relief bend in the tabs provides robust mechanical connection between the cells and printed circuit board. Printed circuits on the board allow the cells to be electrically connected in various configurations. Terminal and connectors on the printed circuit board provide connection to a load and monitoring device. A vehicle battery pack is comprised of a plurality of vehicle battery modules.

20 Claims, 2 Drawing Sheets

(56) References Cited

U.S. PATENT DOCUMENTS

| | | |
|---|---|---|
| 6,507,196 B2 | 1/2003 | Thomsen et al. |
| 6,749,950 B2 | 6/2004 | Zhang |
| 7,125,628 B2 | 10/2006 | Marukawa et al. |
| 2003/0031920 A1* | 2/2003 | Hoffman et al. ................. 429/66 |
| 2005/0136747 A1* | 6/2005 | Caveney et al. ............. 439/676 |
| 2006/0257731 A1* | 11/2006 | Yoon ............................. 429/176 |
| 2007/0238359 A1* | 10/2007 | Gutierrez et al. ........ 439/620.01 |
| 2008/0207021 A1* | 8/2008 | Hsu et al. ........................ 439/79 |
| 2008/0213652 A1* | 9/2008 | Scheucher ...................... 429/62 |
| 2008/0220665 A1* | 9/2008 | Darr et al. ..................... 439/842 |
| 2008/0318088 A1* | 12/2008 | Cruise et al. ..................... 429/7 |
| 2009/0017647 A1* | 1/2009 | Horiuchi ..................... 439/76.1 |
| 2010/0118505 A1* | 5/2010 | Marten et al. ................. 361/803 |
| 2011/0248200 A1* | 10/2011 | Fathauer .................. 251/129.15 |

* cited by examiner

VEHICLE BATTERY MODULE

CROSS-REFERENCE TO RELATED APPLICATION

This application claims the benefit of U.S. Provisional Patent Application Ser. No. 61/109,782, filed Oct. 30, 2008.

BACKGROUND OF THE INVENTION

1. Field of the Invention

The present invention relates generally to a battery, and, more particularly to a vehicle battery module having a plurality of flat, rectangular shaped electrochemical or electrostatic cells having flexible tabs for terminals.

2. Description of the Related Art

A secondary battery is a device having one or more electrochemical or electrostatic cells, hereafter referred to collectively as "cells", that can be charged electrically to provide a static potential for power or released electrical charge when needed. The cell is basically comprised of at least one positive electrode and at least one negative electrode. One common form of such a cell is the well-known secondary alkaline cell packaged in a cylindrical metal can. Examples of chemistry used in such secondary cells are nickel cadmium (NiCd), nickel zinc (NiZn), and nickel metal hydride (NiMh). Other types of cells include capacitors, which can come in the form of electrolytic, tantalum, ceramic, magnetic, and include the family of super and ultra capacitors. Such cells are mass produced, driven by an ever-increasing consumer market that demands low cost rechargeable energy for portable electronics. Energy density is a measure of a cell's total available energy with respect to the cell's mass, usually measured in Watt-hours per kilogram, or Wh/kg. Power density is a measure of the cell's power delivery with respect to the cell's mass, usually measured in Watts per kilogram, or W/kg.

In order to attain the desired operating voltage level, cells are electrically connected in series to form a battery of cells, what is typically referred to as a battery. In order to attain the desired current level, cells are electrically connected in parallel. When cells are assembled into a battery, the cells are often linked together through metal strips, straps, wires, bus bars, etc., that are welded, soldered, or otherwise fastened to each cell to link them together in the desired configuration.

Secondary batteries are often used to drive traction motors in order to propel electric vehicles. Such vehicles include electric bikes, motorcycles, cars, busses, trucks, trains, and so forth. Such traction batteries are usually large format types, comprised of tens to hundreds or more individual cells. The cells are linked together internally and installed into a case to form the completed battery.

Cells come in various shapes and sizes. One example is the cylindrical metal can style, such as the familiar AA, SC, C, and D cells, among others. Such cells are physically robust and can be soldered or welded together to form large batteries. One drawback to metal can cells is the increased mass driven by the metal can itself. Another is the inability of the metal can to expand in order to accommodate gas density variations in the cell, which can occur in some chemistry types. Increased internal pressure can be hazardous as the build up can result in cell rupture or even explosion.

Another type of cell is the flat rectangular type, which is often packaged in a flexible container. These cells are lighter than their metal can counterparts, and can expand and contract in order to equalize internal pressures. These cells are also lower cost to manufacture, and are thus preferable to use in application for these reasons. Flat rectangular cell terminals typically take the form of a pair of flexible conductive tabs, one positive and one negative. These tabs are soldered or welded to bus bars and formed into larger batteries.

Flat rectangular cell terminals typically take the form of a pair of tabs, one positive and one negative. These tabs are soldered or welded to bus bars and formed into larger batteries. One drawback with these cells is that the tabs are mechanically weak and prone to breaking and tearing. In addition, welding is difficult as the thin tabs are not conducive to welding, increasing assembly time and cost. Another problem is series connection, which requires many small bus bars to join cells together in an alternating fashion to increase voltage.

Welded or soldered straps and wire interconnects also reduce cell performance through the generation of heat. The wires and straps themselves have electrical resistance that creates significant amounts of heat when a current passes through, and can get very hot under high current traction motor situations such as acceleration. This heat reduces the power and energy coming out of the battery, and, more importantly, heat is imparted directly to the cells. Heat is one of the most important contributors to reduced cell life. Some cells can see a drop by 50% or more in life cycle when operated at elevated temperatures. Cycle life is very important in vehicle applications where the battery investment may be very high.

Thus, a vehicle battery module solving the aforementioned problems is desired.

SUMMARY OF THE INVENTION

The vehicle battery module includes cut rubber tubing attached to the tops of voltaic cells. Tabs from the cells pass through seating apertures in a printed circuit board. The rubber tubing atop each cell buffers contact between the circuit board (PCB) and the cell's top edge. Solder joints secure electromechanical connection of the tabs to the printed circuit board. A strain relief bend in the tabs provides robust mechanical connection between the cells and printed circuit board. Printed circuits on the board allow the cells to be electrically connected in various configurations. Terminal and connectors on the printed circuit board provide connection to a load and monitoring device. A plurality of vehicle battery modules is used to construct a vehicle battery pack having a positive terminal and a negative terminal to supply battery voltage to a load.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
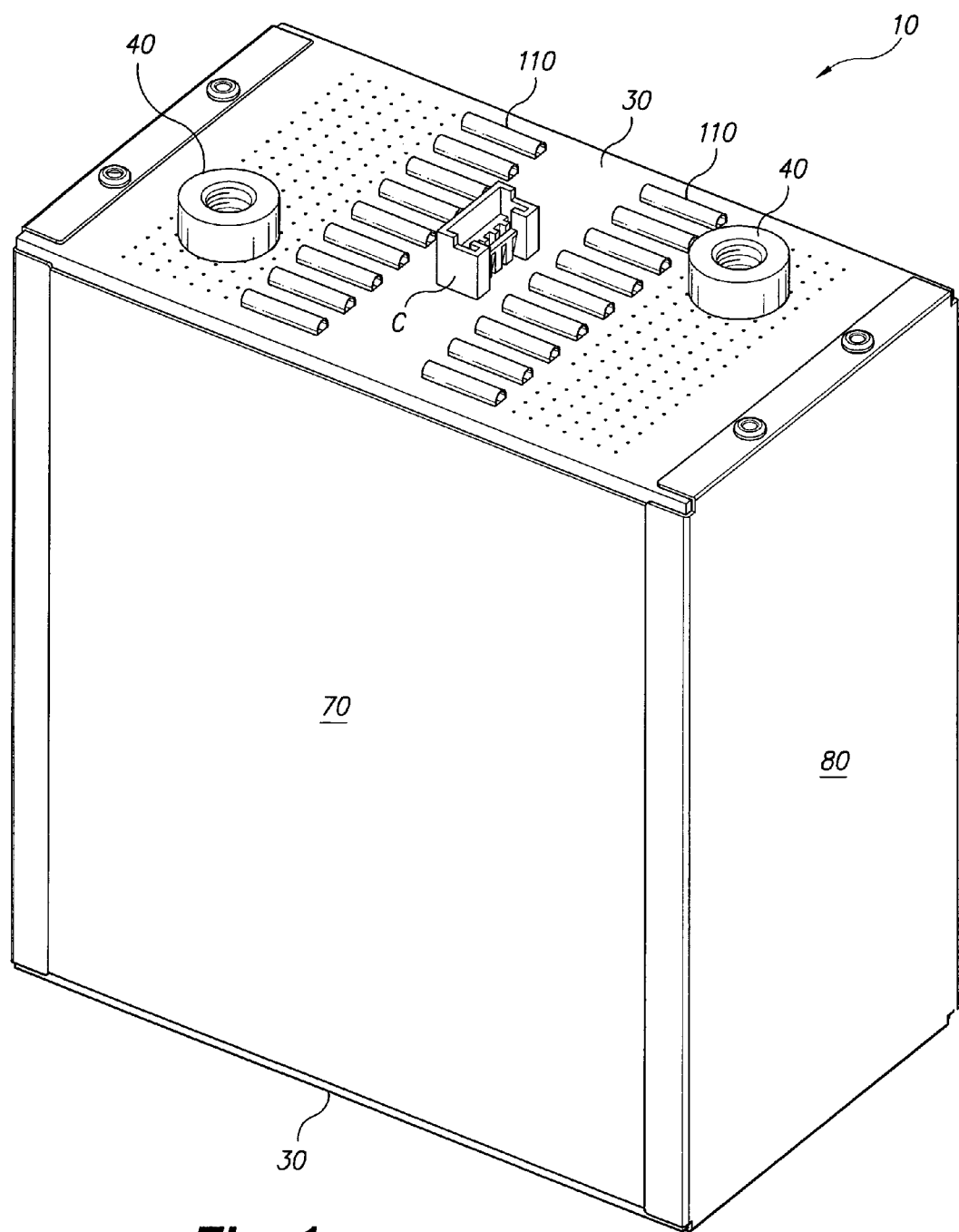
FIG. 1 is an exploded perspective view of a vehicle battery module according to the present invention.
Figure 2:
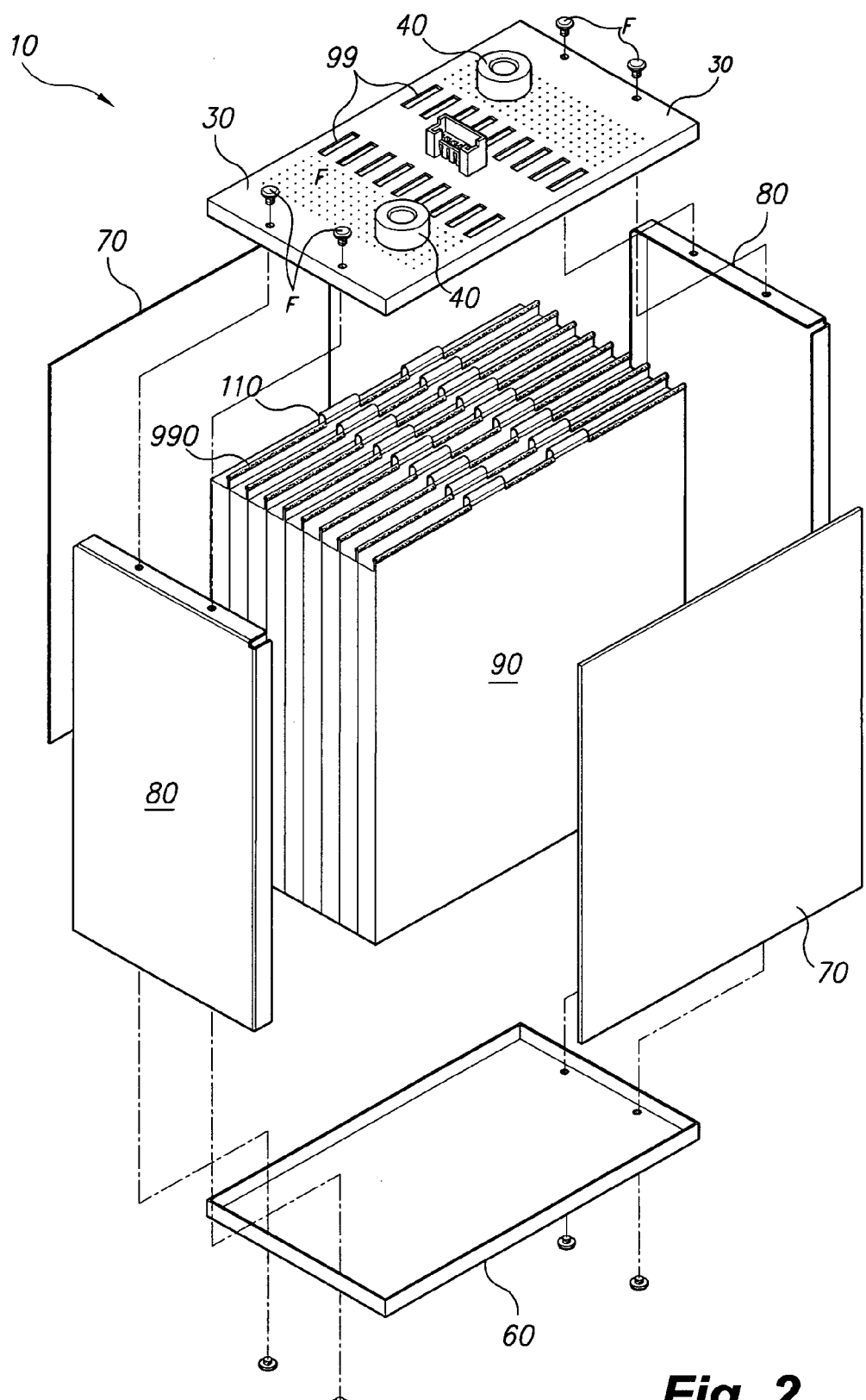
FIG. 2 is a perspective view showing how the circuit board attaches to the tabs of the vehicle battery module according to the present invention.

As shown in FIG. 1, the vehicle battery module 10 comprises a plurality of electrochemical or electrostatic cells 90, i.e., "voltaic cells" that are disposed between a circuit board 30 and a bottom housing member 60. The voltaic cells 90 are substantially rectangular, planar members arranged in parallel relation to each other. For each of the cells 90, positive and negative cell tabs 110 extend from the top of the cell 90. One or more battery modules 10 may be disposed within a common housing and used in series or parallel operation to attain the desired voltage and current for a particular application. In the example given, the battery module 10 depicted in FIG. 1 contains a plurality of cells 90. For example, the module 10 may contain thirty cells.

As illustrated in FIG. 1, the cells 90 are retained in their parallel configuration by the circuit board 30 and bottom housing member 60. Flexible tubing 990 attached to top edge of each cell 90 constrains vertical movement between circuit board and housing bottom while still allowing a small amount of flexibility to accommodate expansion and contraction of the cell 90.

A printed circuit board 30 is affixed to the upper surface of the voltaic cells 90 in the following manner. The positive and negative cell tabs 110 of the cells 90 pass through narrow seating apertures 99 in the printed circuit board 30. Solder pads are disposed on the circuit board 30 proximate the seating apertures 99 to facilitate soldering of the tabs 110 to the board 30.

The tabs 110 of cells 90 have a bent shape in order to reduce stress failure and are soldered to their respective seating apertures 99 after the printed circuit board 30 has been properly seated over the cells 90. The stress bend on the tabs 110 allow the tabs 110 to move slightly with the expansion and contraction of a cell 90, during shock or vibration thereby minimizing fatigue of the tabs at the attachment joint to the circuit board 30.

Traces on printed circuit board 30 connect the cells 90 in the desired electrical configuration. For example in a thirty cell battery module 10 all thirty cells can be in parallel, yielding a 1S30P configuration, or the cells 10 can be connected in series, yielding a 10S3P configuration (This means there are 10 cells in series, 3 sets of 10 cells being configured in parallel), or the like. Advantageously, utilizing traces on the PCB 30 to custom configure electrical connectivity of the cells 90 allows for reconfiguration of the module 10 without changing the geometry of the mechanical design or complicating the assembly in any way.

The battery module 10 has terminals 40 extending from the circuit board 30 to provide electrical access. Additionally, one or more connectors C may extend from the printed circuit board 30 to allow a monitoring device to access the circuitry of module 10. End plates 70 and side plates 80 complete the housing of the battery module 10, which is secured in place by fasteners F, which may be screws, rivets and/or similar hardware. The side plates 80 have peripheral folded edges, which retain the end plates 70 to complete the housing enclosure. The side plates 80 may contain perforations that allow ventilation.

The preferred material for the flexible tubular members 990 is rubber, or plastic, such as ABS. Bottom housing member 60 can be plastic, such as ABS or machined metal, such as aluminum or steel. Similarly, the preferred materials for the end plates 70 and side plates 80 is plastic, such as ABS or machined metal, such as aluminum or steel. Low cost manufacturing techniques such as stamping and injection molding are suitable for this design. The preferred material for the printed circuit board 30 is fiberglass, and such boards can be cheaply mass produced using widespread and well known manufacturing systems.

A battery in accordance with the exemplary embodiment of the present invention includes a housing, an external positive terminal and an external negative terminal. The battery has at least one internal cavity into which is disposed at least one battery module 10. The external positive terminal and external negative terminal are mounted internally. The external positive terminal and external negative terminal may be the same positive terminal and a negative terminal of the battery module 10 merely protruding through the surface; such would be the typical case when there is only one battery module 10.

Alternatively, external positive terminal and external negative terminal may be separate from positive terminal and a negative terminal of the battery module 10. This may be the case when there is a plurality of battery modules 10 that are combined by a secondary strapping end plate that connects the plurality of battery modules 10 together in series or parallel in order to obtain the design battery operating configuration.

It is to be understood that the present invention is not limited to the embodiment described above, but encompasses any and all embodiments within the scope of the following claims.

I claim:

1. A vehicle battery module, comprising:
a plurality of substantially rectangular, planar voltaic cells arranged in parallel relation to each other, each of the plurality of substantially rectangular, planar voltaic cells having a top portion and a top edge;
positive and negative voltaic cell tabs extending from the top portion of each of the plurality of substantially rectangular, planar voltaic cells, each of the positive and negative voltaic cell tabs having a stress-relieving, bent shape;
a flexible nonconductive tubular member attached to the top edge of each of the plurality of substantially rectangular, planar voltaic cells, the tubular members being spaced to leave gaps to expose the positive and negative voltaic cell tabs;
a printed circuit board attached to the top portion of the plurality of substantially rectangular, planar voltaic cells, the printed circuit board having seating apertures receiving the positive and the negative voltaic cell tabs the positive and the negative voltaic cell tabs being seated in the seating apertures of the printed circuit board, said stress-relieving, bent shape of each of the positive and the negative voltaic cell tabs passing through and being electromechanically soldered to a respective one of the seating apertures, thereby forming electrical nodes on the printed circuit board at cell tab locations, wherein said stress-relieving, bent shape is configured to reduce fatigue of said positive and negative voltaic cell tabs at solder joints to said printed circuit board;
at least one printed circuit defined on the printed circuit board, the at least one printed circuit interconnecting the electrical nodes through conductive traces on said printed circuit board to achieve a desired electrical configuration of the plurality of substantially rectangular, planar voltaic cells;
a positive module terminal and a negative module terminal disposed on the printed circuit board, the positive and negative module terminals delivering electrical power from the vehicle battery module; and
a housing enclosing the plurality of substantially rectangular, planar voltaic cells.

2. The vehicle battery module of claim 1, wherein said tubular members and a bottom housing member of said housing are made from plastic.

3. The vehicle battery module of claim 1, wherein all of said housing is made from plastic.

4. The vehicle battery module of claim 1, wherein said printed circuit board is made from a material selected from the group consisting of fiberglass and polymer, the printed circuit board having copper traces and a solder mask protective coating.

5. The vehicle battery module of claim 1, further comprising retaining hardware selected from the group consisting of screws, bolts, and rivets.

6. The vehicle battery module of claim 1, further comprising means for connecting the vehicle battery module to a monitoring device.

7. The vehicle battery module of claim 1, wherein said housing covers said printed circuit board, said positive and negative terminals extending through said housing.

8. A battery module comprising:
   a plurality of voltaic cells each comprising:
      positive and negative voltaic cell tabs extending from a top portion of each of said plurality of voltaic cells, each of said positive and negative voltaic cell tabs having a stress-relieving, bent shape;
      a flexible nonconductive tubular member attached to a top edge of each of said plurality of voltaic cells;
   a printed circuit board having seating apertures configured to receive said positive and negative voltaic cell tabs, said stress-relieving, bent shape of each of the positive and the negative voltaic cell tabs passing through and being electromechanically soldered to a respective one of the seating apertures, thereby electrically connecting said printed circuit board to said plurality of voltaic cells, wherein said stress-relieving, bent shape is configured to reduce fatigue of said positive and negative voltaic cell tabs at solder joints to said printed circuit board;
   wherein electrical nodes are formed at said seating apertures of said printed circuit board and interconnected through conductive traces on said printed circuit board to achieve a desired electrical configuration of said plurality of voltaic cells.

9. The battery module of claim 8, further comprising a positive module terminal and a negative module terminal disposed on said printed circuit board.

10. The battery module of claim 8, further comprising a housing enclosing said plurality of voltaic cells.

11. The battery module of claim 8, wherein said tubular member of each of said plurality of voltaic cells is made from plastic.

12. The battery module of claim 9, wherein said housing is made from plastic.

13. The battery module of claim 8, wherein said printed circuit board is made from a material selected from the group consisting of fiberglass and polymer, the printed circuit board having copper traces and a solder mask protective coating.

14. The battery module of claim 8, further comprising retaining hardware selected from the group consisting of screws, bolts, and rivets.

15. The battery module of claim 8, further comprising means for connecting said battery module to a monitoring device.

16. The battery module of claim 8, further comprising a housing covering said printed circuit board, and positive and negative terminals extending through said housing.

17. A battery comprising:
   a plurality of battery modules, each of said plurality of battery modules comprising a plurality of battery cells each comprising:
      positive and negative cell tabs extending from a top portion of each of said plurality of battery cells, each of said positive and negative cell tabs having a stress-relieving, bent shape;
      a flexible nonconductive tubular member attached to a top edge of each of said plurality of battery cells;
   a printed circuit board having seating apertures configured to receive said positive and negative cell tabs, said stress-relieving, bent shape of each of the positive and the negative voltaic cell tabs passing through and being electromechanically soldered to a respective one of the seating apertures, thereby electrically connecting said printed circuit board to said plurality of battery cells, wherein said stress-relieving, bent shape is configured to reduce fatigue of said positive and negative voltaic cell tabs at solder joints to said printed circuit board;
   wherein electrical nodes are formed at said seating apertures of said printed circuit board and interconnected through conductive traces on said printed circuit board to achieve a desired electrical configuration of said plurality of battery cells.

18. The battery of claim 17, wherein each of said plurality of battery cells is a rectangular voltaic cell.

19. The battery of claim 17, further comprising a positive module terminal and a negative module terminal disposed on said printed circuit board.

20. The battery of claim 17, further comprising a housing enclosing said plurality of battery cells.

* * * * *